United States Patent
Luyks

(10) Patent No.: US 9,446,842 B2
(45) Date of Patent: *Sep. 20, 2016

(54) HYBRID POWER ROTARY WING AIRCRAFT

(71) Applicant: The Boeing Company, Chicago, IL (US)

(72) Inventor: Leo J. Luyks, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/979,704

(22) Filed: Dec. 28, 2015

(65) Prior Publication Data

US 2016/0107748 A1     Apr. 21, 2016

Related U.S. Application Data

(62) Division of application No. 13/916,283, filed on Jun. 12, 2013, now Pat. No. 9,248,908.

(51) Int. Cl.
*B64C 27/12* (2006.01)
*B64C 27/52* (2006.01)
*B64C 27/82* (2006.01)
*B64D 27/24* (2006.01)
*B64D 27/02* (2006.01)

(52) U.S. Cl.
CPC .............. *B64C 27/12* (2013.01); *B64C 27/52* (2013.01); *B64C 27/82* (2013.01); *B64D 27/24* (2013.01); *B64C 2027/8209* (2013.01); *B64D 2027/026* (2013.01); *Y10S 903/903* (2013.01)

(58) Field of Classification Search
USPC .............. 244/17.11, 17.23, 17.25, 53 R, 60, 244/17.13, 76 R; 903/903, 905, 906
See application file for complete search history.

(56) References Cited

U.S. PATENT DOCUMENTS

| | | | |
|---|---|---|---|
| 2010/0038473 A1* | 2/2010 | Schneider | B64D 27/24 244/60 |
| 2012/0234968 A1* | 9/2012 | Smith | B64C 29/0033 244/12.3 |
| 2013/0068876 A1* | 3/2013 | Radu | B60F 5/02 244/2 |
| 2013/0092789 A1* | 4/2013 | Botti | B64C 27/14 244/54 |

* cited by examiner

*Primary Examiner* — J. Woodrow Eldred
(74) *Attorney, Agent, or Firm* — Miller, Matthias & Hull LLP

(57) ABSTRACT

A rotary wing aircraft includes a main rotor; an electric motor for rotating the main rotor; an electric generator for supplying electric power to the electric motor; an engine for driving the generator; and battery storage for providing battery power. The aircraft further includes a flight control system for controlling the engine to run at idle and causing the electric motor to receive the battery power to rotate the main rotor during takeoff; for controlling the engine to increase speed above idle and operate the generator to recharge the battery storage during flight; and for controlling the engine to return to idle and controlling the electric motor to receive the battery power for landing.

10 Claims, 2 Drawing Sheets

HYBRID POWER ROTARY WING AIRCRAFT

This is a divisional of copending U.S. patent application Ser. No. 13/916,283 filed 12 Jun. 2013.

BACKGROUND

Conventional rotary wing aircraft or helicopters are powered with either an internal combustion engine or a turbine engine that is coupled to a gear box system which transmits the rotational output of the engine to the main rotor of the aircraft and to the tail rotor of the aircraft. The gear boxes of rotary wing aircraft require regular monitoring and periodic maintenance to ensure their reliable operation. Gear boxes do not have graceful failure modes and if one piece should fail it is likely the entire gear box will fail. Gear boxes are also expensive to manufacture. Additionally, the tail rotor drive transmission of a rotary wing aircraft is complex, especially for helicopters having an air frame with a folding tail for ground storage. These tail rotor drive transmissions also require regular monitoring and periodic maintenance to guard against failures. The main rotor gear box and the tail rotor drive transmission of a rotary wing aircraft also employ hydraulic actuators and gear box driven hydraulic systems to control the main rotor gear box and tail rotor drive transmission. These hydraulic control systems add to the weight of the aircraft and reduce its operation efficiency.

SUMMARY

A rotary wing aircraft comprises a main rotor; an electric motor for rotating the main rotor; an electric generator for supplying electric power to the electric motor; an engine for driving the generator; and battery storage for providing battery power. The aircraft further comprises a flight control system for controlling the engine to run at idle and causing the electric motor to receive the battery power to rotate the main rotor during takeoff; for controlling the engine to increase speed above idle and operate the generator to recharge the battery storage during flight; and for controlling the engine to return to idle and controlling the electric motor to receive the battery power for landing.

The features, functions, and advantages that have been discussed can be achieved independently in various embodiments or may be combined in other embodiments further details of which can be seen with reference to the following description and drawings.

DETAILED DESCRIPTION

Figure 1:
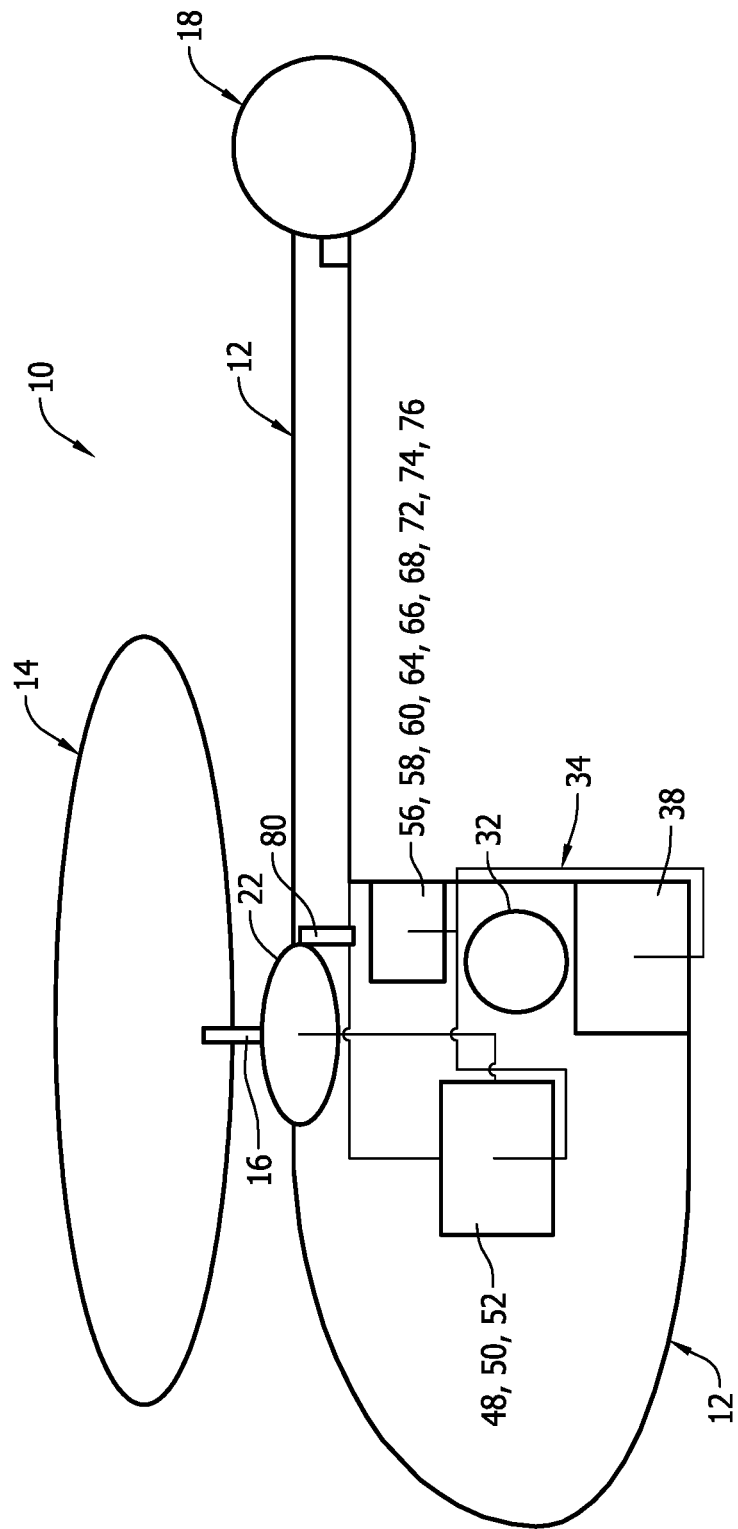
FIG. 1 is a schematic representation of the enhanced fuel efficiency rotary wing aircraft.
Figure 2:
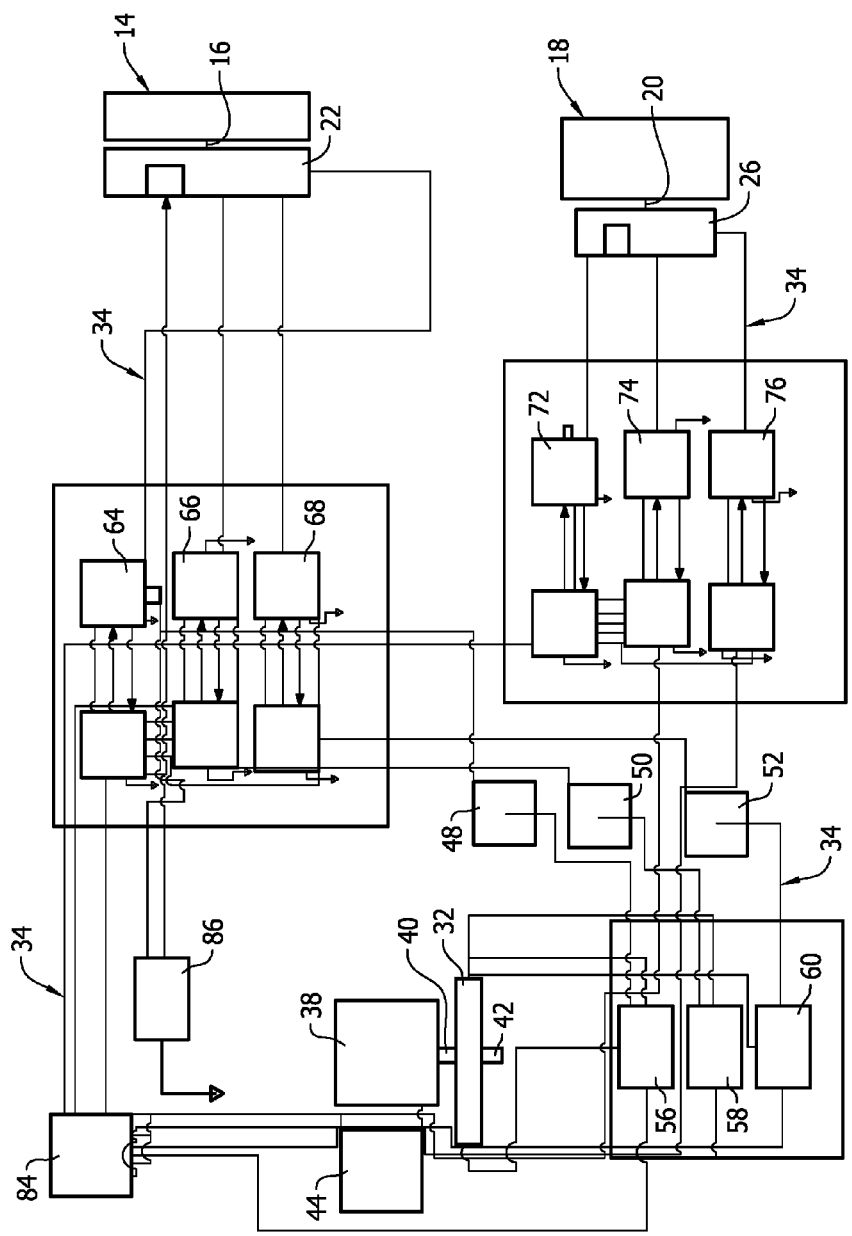
FIG. 2 is a schematic representation of the hybrid system block diagram of the enhanced fuel efficiency rotary wing aircraft.

Reference is made to FIGS. 1 and 2, which illustrate a hybrid power rotary wing aircraft 10. The aircraft 10 is an advanced version of a conventional helicopter platform. The design inherently allows a single engine helicopter to be just as safe as a twin-engine helicopter at lower cost and higher fuel efficiency. The following technologies have matured to make this design possible: modern light weight turbocharged diesel engines with electronic fuel controls, efficient high power electrical switching devices (IGBTs), digital commutation controls (IWMC), lightweight high power density lithium ion batteries, carbon fiber structures (advanced rotor blades which allow variable rpm), and efficient brushless dc motors (ring motors). The aircraft 10 has a substantially conventional airframe 12 that supports the component parts of the aircraft.

A main rotor is mounted to the airframe 12 for rotation of the main rotor relative to the airframe 12. It is a conventional single main rotor system, multiple blade rotor. The main rotor is comprised of a plurality of rotor blades 14 that are mounted to a rotor shaft 16. The rotor shaft 16 is mounted to the airframe 12 for rotation of the rotor shaft 16 and the rotor blades 14 relative to the airframe 12.

A tail rotor 18 is also mounted to the airframe 12 for rotation of the tail rotor relative to the airframe. The tail rotor 18 is comprised of a plurality of tail rotor blades and a tail rotor shaft 20.

A main rotor electric motor 22 is mounted to the airframe 12. The main rotor electric motor 22 is operatively connected to the main rotor shaft 16. Running the main rotor electric motor 22 rotates the rotor shaft 16 and the rotor blades 14 of the main rotor of the aircraft. In the preferred embodiment of the aircraft 10, the main rotor electric motor 22 is connected directly to the main rotor shaft 16, meaning that there are no intervening gear boxes or equivalent devices between the main rotor electric motor 22 and the main rotor shaft 16. This eliminates the need for a main gear box. The ratio of rotations of the main rotor electric motor output shaft and the blades of the main rotor is 1 to 1. A rigid rotor design allows for variable rotor speed without the inherent vibration problem associated with articulated rotors.

A tail rotor electric motor 26 is also mounted to the airframe 12 of the aircraft 10. The tail rotor electric motor 26 is operatively connected to the tail rotor 18. Running the tail rotor electric motor 26 rotates the tail rotor 18 of the aircraft 10. In the preferred embodiment of the aircraft 10, the tail rotor electric motor 26 is directly connected to the tail rotor 18, meaning that there are no intervening gear boxes or other equivalent devices between the tail rotor electric motor 26 and the tail rotor 18. The ratio of the rotations of the tail rotor electric motor output shaft and the blades of the tail rotor 18 is 1 to 1. The tail rotor 18 is a conventional tail fan design with single motor rotation direction and collective control of tail rotor blade pitch via redundant electric linear actuators.

An electric generator 32 is mounted to the airframe 12 of the aircraft 10. The generator 32 is an interleaved generator with three phases. The generator phases are isolated and inverted by separate inverters to allow for electric power generation redundancy. The electric generator 32 is operatively, electrically connected to the main rotor electric motor 22. Operating the electric generator 32 or rotating the rotor of the electric generator 32 generates power that is supplied from the generator 32 through an electrical network 34 of the aircraft 10 (represented in FIG. 2) to the main rotor electric motor 22 to run the main rotor electric motor 22. The electric generator 32 is also operatively, electrically connected to the tail rotor electric motor 26 through the electrical network 34. Operating the electric generator 32 or rotating the rotor of the generator 32 produces electric power that is supplied through the network 34 to the tail rotor electric motor 26 to run the tail rotor electric motor 26.

A combustion engine 38 is mounted to the airframe 12 of the aircraft 10. The combustion engine 38 is operatively connected to the generator 32. Running the combustion engine 38 rotates the rotor of the generator 32 and operates the generator 32. In the preferred embodiment of the aircraft 10, the combustion engine 38 is a lightweight turbocharged diesel engine. The diesel engine 38 allows fuel compatibility with existing aviation systems. Turbo charging is employed to provide forced induction and resulting performance gains. The engine 38 and generator 32 are optimized to operate in the 2000 rpm range. The hybrid aircraft 10 allows for the lighter diesel engine 38, and peak loads can be handled from the battery system to be described.

For the aircraft 10, a typical flight would take off at idle using battery power, then ramp up power with the diesel engine to recharge the batteries, then reduce to cruise, then back to idle to land under battery power. The turbocharged diesel provides low specific fuel consumption at a wide range of power, altitude, and rpm settings consistent with aircraft operating over a wide range of mission takeoffs, loiter, surge, etc. Existing turboshaft engines have a specific fuel consumption rating of 0.8 while advanced turbocharged diesel engines have a rating of 0.3 to 0.34. A significant portion of a helicopter gross weight is fuel. The fuel savings will benefit the helicopter design allowing lighter structure and reduced fuel tankage to offset the required volume for the battery system to be described.

Engine cooling is provided by a conventional radiator system with an electric fan forced air system. The electric fan allows for further efficiencies as the fan motor can be shut down during cruise or at high altitude when not needed to maintain engine temperature.

The combustion engine 38 includes an electronic engine controller 44. The electronic engine controller 44 adjusts the speed of the rotation of the engine output shaft 40 in response to electrical signals received by the engine controller 44. In the preferred embodiment of the aircraft 10, an output shaft 40 of the combustion engine 38 is directly connected to a rotor shaft 42 of the generator 32. By being directly connected what is meant is that the engine output shaft 40 is directly connected to the generator rotor shaft 42 with there being no intervening gear boxes or other equivalent devices. The ratio of the rotation of the engine output shaft 40 and the generator rotor shaft 42 is 1 to 1.

A plurality of batteries 48, 50, 52 are mounted to the airframe 12 of the aircraft 10. The batteries 48, 50, 52 are operatively, electrically connected with the electric generator 32 to receive electric power from the operating generator which charges the batteries. The batteries 48, 50, 52 are also operatively, electrically connected to the main rotor electric motor 22 to supply power to the main rotor electric motor 22, and to the tail rotor electric motor 26 to supply power to the tail rotor electric motor 26. In the preferred embodiment of the aircraft 10, three batteries 48, 50, 52 are mounted to the airframe 12 of the aircraft 10. The three batteries 48, 50, 52 provide redundancy to the hybrid propulsion system of the aircraft 10. Additionally, in the preferred embodiment of the aircraft 10 the three batteries 48, 50, 52 are each high energy density lithium ion batteries. The batteries 48, 50, 52 also provide backup power in the event of a diesel engine failure and are sized to provide sufficient energy for a take off followed by abort to landing. The batteries operate at the 270 V range. Battery charge control and over voltage protection is managed by generator inverters to be described.

Three separate, isolated power busses operating in the 270 V range are provided for redundancy in distribution of the generated power to the motors 22, 26. Multiple inverters drive the motors 22, 26 using a motor phase interleave technique to provide electrical redundancy and inverter power density efficiency. The integrated motor and inverter combination is fault tolerant to electrical failures. The generator 32 output is commutated, conditioned and controlled by the inverters.

A plurality of first electric current inverters 56, 58, 60 are mounted to the airframe 12 of the aircraft 10. Each of the first inverters 56, 58, 60 is operatively, electrically connected to the electric generator 32 through the electric network 34 and each of the first inverters 56, 58, 60 is operatively, electrically connected to the respective batteries 48, 50, 52 through the network 34. Each of the inverters 56, 58, 60 includes a micro-controller unit and converts alternating electric current created by the electric generator 32 to direct electric current and supplies the direct electric current to the respective batteries 48, 50, 52 to charge the batteries.

A plurality of second electric current inverters 64, 66, 68 is also provided on the airframe 12 of the aircraft 10. Each of the second inverters 64, 66, 68 is operatively, electrically connected to a respective battery 48, 50, 52 through the electrical network 34 and is also operatively, electrically connected to the main rotor electric motor 22 through the electric network 34. Each of the second inverters 64, 66, 68 includes a microcontroller and receives direct electric current supplied by a respective battery 48, 50, 52 and converts the direct electric current to alternating electric current. The alternating electric current is supplied by each of the second inverters 64, 66, 68 to the main rotor electric motor 22 as one phase of a three phase system. The three phases of the alternating current supplied by the second inverters 64, 66, 68 to the main rotor electric motor 22 run the motor 22. The inverter control can vary the rpm of the main rotor electric motor 22 to allow operation of the main rotor at the most efficient operating point for a given flight regime and aircraft weight over time.

A plurality of third electric current inverters 72, 74, 76 is also provided on the airframe 12 of the aircraft 10. Each of the third electric current inverters 72, 74, 76 is operatively, electrically connected to a respective battery 48, 50, 52 through the electric network 34 and is also operatively, electrically connected to the tail rotor electric motor 26. Each of the third inverters 72, 74, 76 includes a microcontroller and receives direct electric current supplied by a respective battery 48, 50, 52 and converts the direct electric current to alternating electric current. The alternating electric current is supplied by each of the third inverters 72, 74, 76 as one phase of a three phase system. The three phases of alternating current are supplied to the tail rotor electric motor to run the motor.

A main rotor tilt actuator 80 is also provided on the airframe 12 of the aircraft 10. The tilt actuator is operatively, mechanically connected to the main rotor electric motor 22 to selectively tilt the main rotor electric motor 22 and the main rotor shaft 16 forward during high speed flight of the aircraft 10 to improve the aerodynamic efficiency of the airframe 12 and the rotor blades 14.

A flight control system 84 of the aircraft 10 communicates through the electrical network 34 with the main rotor electric motor 22, the tail rotor electric motor 26, the electric generator 32, the electronic engine controller 44, the electric current inverters 56, 58, 60, 64, 66, 68, 72, 74, 76 and the main rotor tilt actuator 80 and provides control signals from an operator of the aircraft 10 through the electric network 34 to these components of the aircraft. The flight control system 84 includes hardware and software that integrate the generator 32 with control laws pertaining to diesel engine power settings based on system demand and the current operating environment measurements (ambient temperature, altitude, electrical demand, diesel engine temperature and thresholds). The design operates the diesel engine 38 at maximum engine efficiency at any aircraft speed. The hybrid controller logic would automatically vary the diesel engine 38 and rotor motor 22 performance parameters based on takeoff weight, flight conditions, performance settings, etc. Additional efficiencies are gained because the main rotor requires faster rpm in high speed flight and can turn slower in hovering or low speed flight to conserve power.

The electric propulsion is integrated with electro-mechanical actuators mounted on the main rotor electric motor 22 and tail rotor electric motor 26 to provide additional system efficiencies over conventional helicopters which use hydraulic actuators and a gear box driven hydraulic pump system. The all electric tail rotor design facilitates a folding tail system to aid in aircraft storage on the ground.

The electrical network 34 of the aircraft is also provided with a backup power connection 86. When the aircraft 10 is idle, the backup power connection 86 can be connected to a separate source of 24 volt electric power to charge the batteries 48, 50, 52 as the aircraft is idle.

The aircraft 10 described above reduces the fuel consumption of the aircraft by as much as fifty percent of that of a conventional rotary wing aircraft of substantially the same configuration. The aircraft 10 lowers the gross takeoff weight by eliminating gear boxes and drive transmissions, and by eliminating hydraulic control systems for the gear boxes and transmissions as well as other operative surfaces of a conventional rotary wing aircraft. Reducing fuel storage needs also reduces the weight of the aircraft and lowers the carbon footprint of the aircraft by reducing engine specific fuel consumption. The acoustics of the aircraft 10 on take off and landing are also lowered by use of electric power.

Although the hybrid diesel/electric power aircraft has been described above by reference to a specific embodiment, it should be understood that modifications and variations could be made to the aircraft described without departing from the intended scope of the claims appended hereto and their equivalents.

The invention claimed is:
1. A rotary wing aircraft comprising:
a main rotor;
an electric motor for rotating the main rotor;
an electric generator for supplying electric power to the electric motor;
an engine for driving the generator;
battery storage for providing battery power; and
a flight control system for controlling the engine to run at idle and causing the electric motor to receive the battery power to rotate the main rotor during takeoff; for controlling the engine to increase speed above idle and operate the generator to recharge the battery storage during flight; and for controlling the engine to return to idle and controlling the electric motor to receive the battery power for landing.

2. The aircraft of claim 1, wherein the flight control system causes the electric motor to receive electric power from the generator and rotate the main rotor during flight.

3. The aircraft of claim 1, further comprising a tail rotor; and a tail rotor electric motor for rotating the tail rotor; wherein the flight control system causes the generator to supply electric power to the tail rotor electric motor to rotate the tail rotor.

4. The aircraft of claim 3, wherein the tail rotor electric motor is connected directly to the tail rotor.

5. The aircraft of claim 1, wherein the electric motor is connected directly to the main rotor.

6. The aircraft of claim 1, wherein the engine is connected directly to the generator.

7. The aircraft of claim 1, wherein the generator is an interleaved generator having first, second and third phases that are isolated, the aircraft further comprising first, second and third inverters for receiving the batter power and supplying ac power to the first, second and third phases of the electric motor.

8. The aircraft of claim 1, further comprising a radiator system for engine cooling and electric fan forced air system, the electric fan forced air system receiving operating power from the generator.

9. The aircraft of claim 1, further comprising a rotor tilt actuator for the main rotor, the rotor tilt actuator including an electric motor that receives operating power from the generator.

10. The aircraft of claim 1, wherein the engine is a diesel engine.

* * * * *